United States Patent [19]

Barnett

[11] 4,185,371

[45] Jan. 29, 1980

[54] BEADING INSTALLATION TOOL

[76] Inventor: Melvin L. Barnett, Box 194, Sonora, Calif. 95370

[21] Appl. No.: 868,757

[22] Filed: Jan. 12, 1978

[51] Int. Cl.[2] .............................................. B23P 19/02

[52] U.S. Cl. ...................................................... 29/235

[58] Field of Search .................................. 29/235, 270

[56] References Cited

U.S. PATENT DOCUMENTS

| | | | |
|---|---|---|---|
| 3,448,508 | 6/1969 | Passage et al. | 29/235 |
| 3,550,242 | 12/1970 | Sarvay et al. | 29/235 |

*Primary Examiner*—James L. Jones, Jr.
*Attorney, Agent, or Firm*—Robert C. Colwell

[57] ABSTRACT

A tool for installing a locking strip of rubber or other material in a molding comprises an integral handle/-head having a tunnel through the head at a shallow angle to allow passage of the locking strip therethrough. The sole of the head is tapered at both front and rear to allow sliding the tool forward and backward, while grooves on the side of the head displace the lips of the molding to permit entry of the locking strip and closure of the molding around the strip without damage to either molding or locking strip.

6 Claims, 4 Drawing Figures

BEADING INSTALLATION TOOL

BACKGROUND OF THE INVENTION

1. Field of the Invention

The invention relates to a tool for installing elastic materials, and in particular to a one hand operable tool for installing a locking strip in an elastic molding.

2. Prior Art

Several prior art tools are known and may be utilized for installing locking strips in flexible gaskets or moldings. For example, U.S. Pat. No. 3,448,508 discloses a tool particularly suited for installing windows. U.S. Pat. Nos. 3,488,828 and 3,744,113 disclose similar power machine operable tools for installing locking strips, while U.S. Pat. No. 3,550,242 discloses a hand operable tool.

Unfortunately all of these prior art tools suffer from one or more disadvantages. For example, the tool of U.S. Pat. No. 3,448,508 requires two hands for use, which can be a particular disadvantage while installing glass or other material which must be held or manipulated with one hand. The power operated tools, because of their requirement for electricity compressed air or other power, are bulky, difficult to use, and lack portability. Additionally, none of the installation heads of the prior art tools are tapered on their rear portion, thereby preventing the tool from being backed up if it should slip from the grove of the molding. Further, the undesirably large angle of the aperature in the tool heads with respect to the sole unduly increases the friction of the locking strip or beading through the tool, and damages certain types of beading having very thin coatings, for example, "plastic chrome," which tolerates very little bending.

SUMMARY OF THE INVENTION

In one embodiment the tool comprises an integral handle/head having an aperture through the head at a shallow angle relative to the sole of the tool. The sole is oval or elongated in shape, having length greater than width, and being tapered at the front and rear. An indentation is formed around nearly all of the perimeter of the tool to facilitate motion of the tool either forward or rearward.

In operation the front or nose of the tool gradually separates the molding for the locking beading, with the lips of the molding resting in the groove or indentation formed around the perimeter of the head. The locking strip is fed through the opening or aperature in the head into the spread portion of the molding. The shallow angle of the aperture allows the locking strip to pass through the head with little friction, and without unduly distorting the locking strip. The sole of the tool presses the strip into place, while the tapered rear of the sole allows the molding to close around the locking strip. Additionally, the tapered rear sole allows backing up the tool. Further advantages of the tool of this invention will be apparent from the following detailed description.

DETAILED DESCRIPTION

Figure 1:
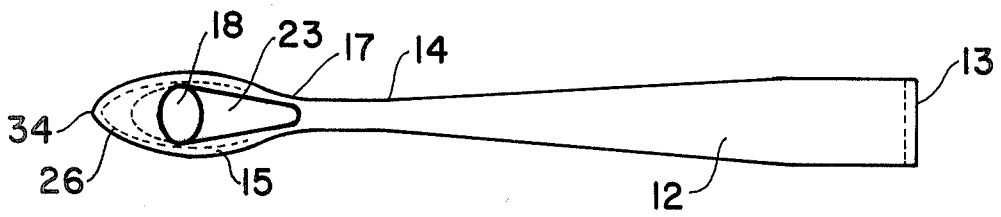
FIG. 1 is a bottom view of one embodiment of the tool.

FIG. 1 is a bottom view of one embodiment of the tool of this invention. Integrally formed from one piece of material are a handle 12 and a head 15. A longitudinal aperature 18 is formed in the head, through which the locking strip (not shown) may pass. The handle 12 tapers from a wider end 13 to a narrower throat 14.

The tapered rear portion 17 of head 15 allows the tool to be basily backed up in the slot in the molding should the tool slip from the opening. The likelihood of the tool slipping out of the molding is greatly reduced by the addition of a groove 26 around the perimeter of the head 15.

Figure 2:
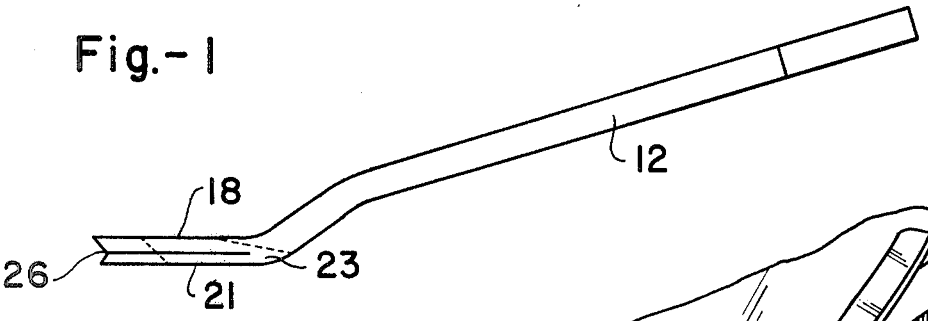
FIG. 2 is a side view of one embodiment of the tool.

A side view of one embodiment of the tool shown in FIG. 2 shows more clearly the shallow angle between the opening 18 and the sole 21. The angle through which the locking strip must turn is made particularly shallow by the addition of a tunnel 23 at the rear end of the sole. This partially recessed region in the sole allows the locking strip to be inserted into the molding at the smallest possible angle, typically less than 30 degrees. This minimizes stresses imposed upon the locking strip, an important advantage when inserting plated or otherwise easily damaged locking strips. The tunnel 23 also allows the tool head 15 to remain flat in the opening in the molding while simultaneously holding the locking strip in the opening until the parted molding closes to lock the locking strip or beading into position.

The groove 26 around the perimeter of the head 15 receives the lips of the molding and smoothly recesses the lips without damaging the molding. This allows the locking strip to slip into place. The groove 26 near the rear of the sole 21 allows the molding to close smoothly about the locking strip while keeping the tool in position, and allows reversing the direction of the tool.

As shown in FIGS. 1 and 2, the tool of this invention may be manufactured in a simple light-weight form capable of being used with one hand. Even relatively rigid moldings may be parted using one hand operation if a lubricant is applied on the molding prior to using the tool.

Figure 3:
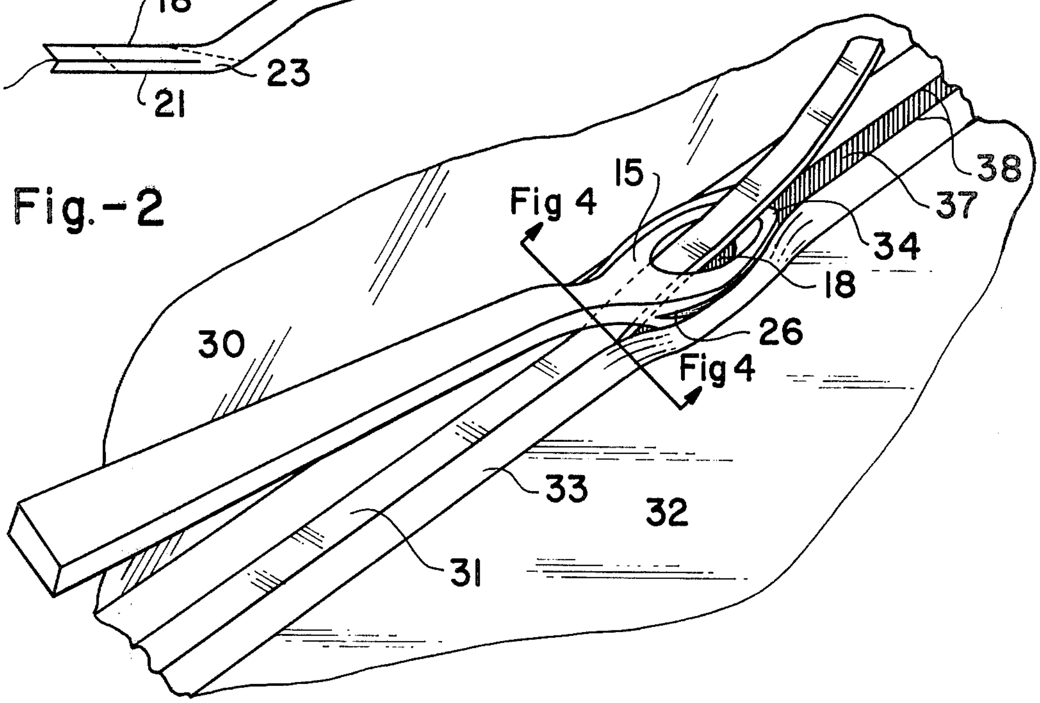
FIG. 3 is a perspective view of the tool showing its operation in installing a locking strip in a molding used to join sheet metal to glass.

FIG. 3 is a perspective view of the tool showing a beading or locking strip 31 being installed in a molding 33 used to join two surfaces, e.g., metal 30 and glass 32. The shallowness of the angle the beading traverses during installation is also shown. The operation of the head 15 of the tool is depicted, including the groove 26 and nose 34. As shown, by pressing the tool forward in the slot 37 in molding 33 the nose 34 and front portion of head 15 enlarge the width of the opening 37 in the elastic molding 33. This allows the locking strip 31 to slip into the slot 37 as the tool passes. The tool is guided in the molding 33 by the fit of the lips 38 in the groove 26.

The locking strip 31 passes through the aperature 18 beneath the head 15 (through the tunnel portion) and is pressed into the opening 37. As the tool passes, the lips 38 emerge from groove 26 at the rear of the head 15 and close to secure the locking strip 31 in position.

Figure 4:
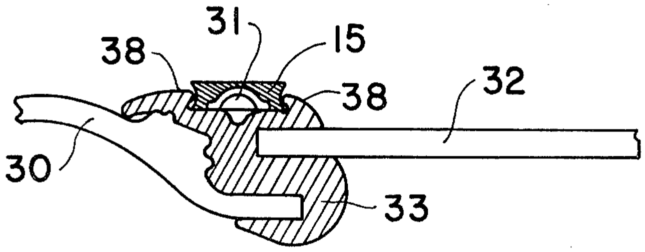
FIG. 4 is a cross-section of the structure shown in FIG. 3.

A cross sectional view of the structure of FIG. 3 is shown in FIG. 4. FIG. 4 shows molding 33 joining sheet metal 30 to glass 32, and shows the lips 38 engaging groove 26 in head 15 to allow locking strip 31 to be inserted into molding 33.

While the preferred embodiment has been illustrated and explained herein above, those familiar with this art will understand various changes and modifications in the tool may be made without departing from the scope or spirit of the invention.

I claim:

1. A beading installation tool for installing beading in a slot in an elastic molding, said tool comprising:

a head portion of length greater than width, having upper and lower surfaces and being tapered at both the front and rear of the head, said head portion including an indentation of uniformly increasing depth formed in the lower surface between an aperture and the rear of the head, the indentation being deepest adjacent the aperture and being shallowest at the rear of the head, and the indentation not extending widthwise to the sides of the head;

the aperture extending through said head from said upper surface to said lower surface, said aperture being closer to the front at the upper surface than at the lower surface;

a groove formed in the periphery of said head and extending around the front and along the sides thereof, the groove extending rearward on each side of the head at least as far as the rearmost portion of the aperture at the upper surface; and handle means attached to the head at the rear portion of the upper surface for applying forward and rearward forces thereto.

2. Structure as in claim 1 wherein the upper and the lower surfaces are parallel.

3. Structure as in claim 2 wherein each of the upper surface and the lower surface is elliptical in shape.

4. Structure as in claim 3 wherein the upper surface is substantially flat.

5. Structure as in claim 1 wherein the angle between the surface of the indentation and the lower surface is less than 30 degrees.

6. Structure as in claim 1 wherein the handle means is a single substantially straight longitudinally extending handle integrally connected to the head.

* * * * *